United States Patent [19]

Chambers et al.

[11] Patent Number: 4,527,015
[45] Date of Patent: Jul. 2, 1985

[54] SECURITY LISTENING SYSTEM

[76] Inventors: Colin T. Chambers, 1528 Myra Ave., Los Angeles, Calif. 90027; James V. Rhodes, P.O. Box 447, Tempe, Ariz. 85281

[21] Appl. No.: 558,316

[22] Filed: Dec. 5, 1983

[51] Int. Cl.³ .......................................... H04M 11/00
[52] U.S. Cl. ................................. 179/84 R; 179/2 A
[58] Field of Search ............ 179/2 A, 5 P, 5 R, 84 R, 179/84 C

[56] References Cited

U.S. PATENT DOCUMENTS 3,530,250  9/1970  Schaum et al. ..................... 179/2 A
4,095,050  6/1978  Beachem et al. .................... 179/2 A
4,353,502  10/1982 Myers ............................. 179/2 A X Primary Examiner—Gene Z. Rubinson
Assistant Examiner—James L. Dwyer
Attorney, Agent, or Firm—Poms, Smith, Lande & Rose

[57] ABSTRACT

A security listening system activated by and transmitting over telephone lines to allow listening for sounds at a remote location over a standard telephone line using a standard telephone instrument at the calling end. The system is connected at the remote site to be monitored across the telephone standard tip/ring pair either in parallel with the standard telephone instrument or in lieu thereof. The system is powered by D.C. voltage obtained by rectifying the telephone voltage or, optionally, by a battery. The unit monitors ring sequences on the telephone line and after a pre-established number, activates the balance of the device. If thereafter during a fixed time duration a pre-established tone signal of minimum duration or longer is applied to the line, the system connects a microphone and amplifier across the telephone line to allow the listener on the other end to hear what is happening in the surrounding area. If the tone is not applied to the line before the timed duration expires, the device deactivates. The need for a tone to connect the microphone is optional.

4 Claims, 5 Drawing Figures

SECURITY LISTENING SYSTEM

BACKGROUND OF THE INVENTION

The present invention relates to devices attached to and activated by a telephone line and, more particularly, to remote listening devices.

There are many uses for a remotely activated listening device that can be attached to a normal telephone line to be activated by a signal on the line from a standard telephone instrument at a different location and transmit the sounds heard back over the telephone line. Consider the following possible examples of uses for such a device:

Case No. 1—George's mother lives alone, is along in years, and refuses to have anyone check on her during the night. George buys a listening device and connects it to his mother's telephone line. It is set to answer on the fifth ring. His mother is only steps away from the telephone and can answer by the third or fourth ring under normal circumstances. If George wants to check and see if his mother is okay, he need only call her. If she does not answer, the listening device answers and he can hear everything and determine if she is okay.

Case No. 2—Sam owns a small business that has a burglar alarm system. When activated, the alarm calls a central station. Several times in the middle of the night, the alarm has been activated, but the premises were not actually entered. Sam knows that the police frown on false alarms. Accordingly, each time he made a needless trip to find out what, if anything, had happened prior to notifying the police. With a listening device, when the alarm company notifies him of alarm, he merely calls the listening device and listens for signs of a break-in or illegal activity before notifying the police.

Case No. 3—Jim is responsible for checking a water pumping station. His job is to be sure that all pumps are running and the tanks are properly filled. The various pieces of equipment each have small tone alarms or bells that sound in case of malfunction. In this case, an immediate response is not necessary. Jim can simply call about once every four hours to a listening device at the pumping station. He avoids having to drive to the pumping station every few hours as he did in the past. Jim can call from anywhere. The only cost is a monthly phone bill, which is small compared to an elaborate alarm system.

Case No. 4—Acme Corporation is a large manufacturing plant which is unoccupied between 7:00 p.m. and 7:00 a.m., weekdays. Using the company PBX, every 30 to 60 minutes the security guard can call several listening devices that have been placed in specific locations. He listens for unusual activities or sounds.

Case No. 5—Harry and Marge own a mountain cabin. When they are not there, they plug a listening device into their phone line. They can periodically call from their home to see if any unusual noises are present about the cabin.

Case No. 6—Mom and Dad go out for the night and leave junior and sis at home. A listening device is set to answer on the first ring. Mom and dad can call back several times to be sure the home is fairly quiet and all is well. As soon as the phone rings, the kids have been told to say a few words in the direction of the listening device.

Wherefore, it is the object of the present invention to provide a simple, reliable listening device which resists unauthorized use and has features which will accomplish the task of the above-described examples.

SUMMARY

The foregoing objectives have been met by the security listening system of the present invention comprising connecting means for electrically connecting to the telephone line; first sensing means operably connected to the connecting means for sensing ring signals on the telephone line; timer means operably connected to the first sensing means for providing a controlled time period after the sensing means senses a pre-established number of rings in a ring sequence; second sensing means operably connected to the timer means and the connecting means for sensing the presence on the telephone line of a pre-established tone during the controlled time period; a microphone for detecting sound; an amplifier operably connected to the microphone for producing sound detected by the microphone amplified at an output thereof; and, switch means operably connected to the connecting means, the second sensing means, and the output of the amplifier for connecting the output of the amplifier to the telephone line after the pre-established tone is sensed during the duration of the controlled time period.

In the preferred embodiment, the listening system additionally comprises restart means operably connected to the second sensing means, the switch means and the timer means for restarting the timer upon the receipt of subsequent ones of the pre-established tone when the amplifier is connected to the telephone line, whereby the controlled time period can be extended.

The preferred embodiment also includes rectifier means having power input connected to the connecting means and a D.C. output connected to the remaining ones of the enumerated means for providing D.C. power to the latter named means for operation derived from the power source on the telephone line thereby eliminating the need for a battery or connection to a separate power source.

DESCRIPTION OF THE PREFERRED EMBODIMENT

Figure 1:
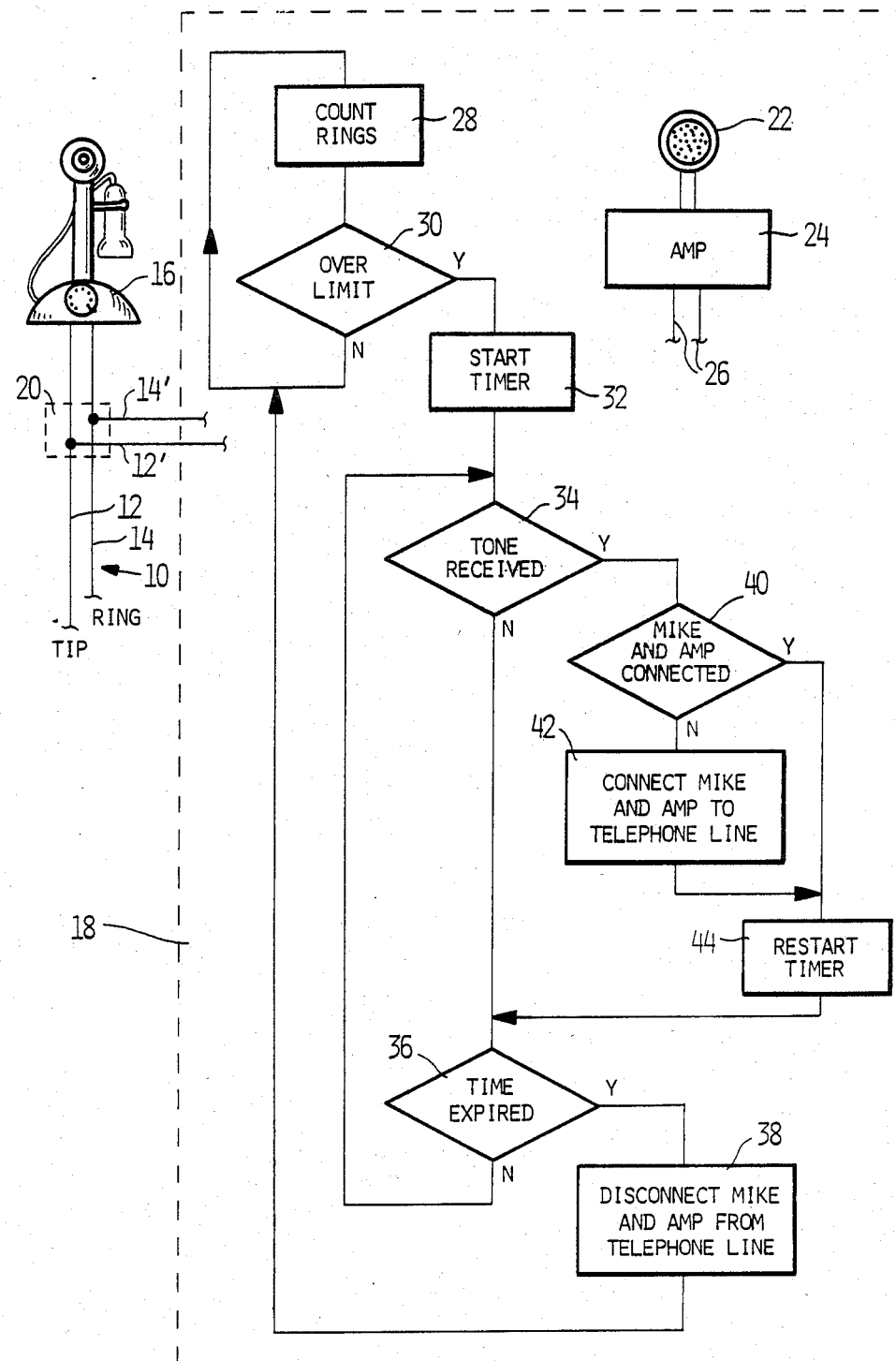
FIG. 1 is a simplified drawing of the device of the present invention in logic form showing the logic performed thereby.

Turning first to FIG. 1, the present invention is shown in the form of a logic diagram descriptive of the functions performed and the logic accomplished. This is also indicative of the fact that while the present invention in the form to be described herein is accomplished with analog components, much of the logic could be implemented in the form of a microprocessor, as is becoming more widely employed in contemporary electronic circuitry. Accordingly, while the description hereinafter is of a commercially available tested analog embodiment, it is anticipated that an embodiment incorporating digital logic to accomplish the same functions would be within the scope and spirit of the present invention.

As shown in FIG. 1, the telephone line, generally indicated as 10, comprises a pair of wires referred to in the telephone industry as the "tip" and "ring", labeled 12 and 14, respectively, which are connected to the telephone instrument 16. The present device, symbolized by the dotted box 18, connects in parallel to the telephone line 10 through the connector symbolized by the dotted box 20, which typically comprises a combination male/female plug inserted in-line with the plug on the telephone instrument 16 in a manner well-known to those skilled in the art. Such a method of connection is typically used with telephone answering devices and the like. From the connector box 20, an auxiliary tip and ring pair, 12', 14', lead into the device 18 in order to accomplish the functions to be described hereinafter with respect to the telephone line 10. The device 18 includes a highly sensitive microphone 22 connected to an amplifier 24 having a pair of output lines 26 which can be selectively connected to the pair 12', 14', as necessary. Upon an incoming call over the telephone line 10, a ring signal appears on tip and ring 12, 14 as well as on the auxiliary tip and ring 12' 14'. The device 18 senses the ring signals and starts counting them at logic block 28. If the receiver is lifted on the telephone 16 before device 18 counts a sufficient number of rings, the device 18 takes no further action and the telephone 16 behaves in a normal manner. At logic question block 30 the logic of device 18 checks to see if the ring sequence in progress has reached a pre-established number. If it has not, the ring sequence count is continued. If it has, at logic block 32, the logic starts a timer and then proceeds to logic question block 34 where it checks to see if a particular tone signal to which the device 18 is responsive has been received. Alternately, a switch in logic block 34, to be described in greater detail below, may be closed to automatically turn on the listening device 18 by connecting output lines 26 to tip and ring lines 12' and 14° without the need for a tone signal. Once activated by the pre-established number of rings in sequence, device 18 only allows a fixed time in which the calling party can inject the tone onto the telephone line 10 before it disconnects device 18, it the switch in logic block 34 is open. This time duration is checked at logic question block 36. If the time has not expired, the logic returns and loops between blocks 34 and 36 checking for the tone and the expiration of the time duration allowed for the placing of the tone on the line. If the time expires, the logic proceeds to logic block 38 where any connections made are disconnected and the logic returns to the basic waiting state to count rings at logic block 28 and logic question block 30. If the tone is received, the logic proceeds to logic question block 40 where it checks to see if the microphone 22 and amplifier 24 have been connected through output lines 26 to the auxiliary tip and ring 12', 14'. If they are not connected, it means that the listening sequence has just been initiated and, accordingly, at logic block 42, the microphone 22 and amplifier 24 are connected, which causes sounds in the area of microphone 22 to be sensed, amplified by amplifier 24, and applied through output lines 26 to the telephone line 10, from where they can be heard by the calling party. If the microphone 22 and amplifier 24 are already connected, and after connecting them, the logic proceeds to logic block 44 where the timer is restarted, after which the logic returns to logic question block 36 and is looped to logic question block 34 checking for expiration of the time. By so doing, device 18 can only listen and be connected to the telephone line 10 for a pre-established amount of time, unless the tone sensed at logic question block 34 is periodically applied to the telephone line 10 within the time period allotted or the switch in logic block 34 is closed. This prevents the device 18 from being inadevertently connected to the telephone line for periods longer than necessary, or longer than those permitted by law.

Figure 2:
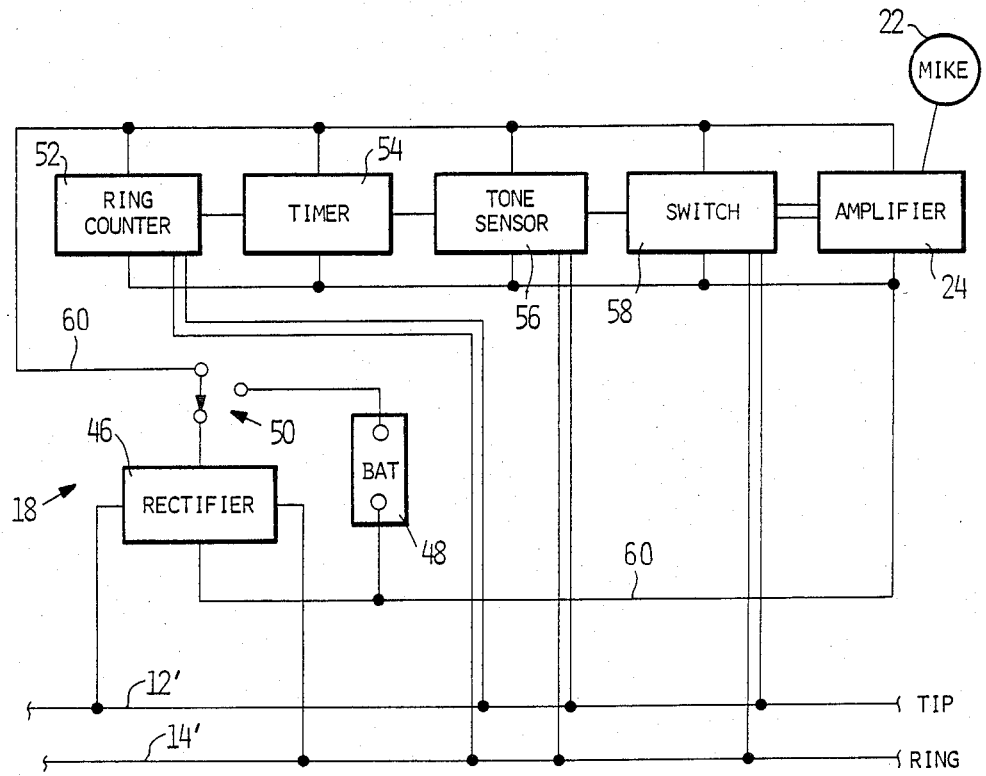
FIG. 2 is a block diagram of the device of the present invention showing the functional relationship of the parts thereof.

Turning now to FIG. 2, device 18 is shown in functional block diagram form. A rectifier circuit portion 46 changes the power on the telephone line to D.C. As can be seen, the basic functional components comprising a ring counter 52, timer 54, tone sensor 56, switch 58, and amplifier 24 are all connected across the D.C. power lines 60 out of the rectifier 46. Further, the ring counter 52, the tone sensor 56 and the amplifier 24, through switch 58, are all connected across the auxiliary tip and ring 12', 14'. As previously described with respect to FIG. 1, the ring counter 52 detects and counts ring signals and, when the proper sequence has been detected, activates the timer 54. The tone sensor 56 watches for a specific tone on the telephone line and, when sensed, resets the timer 54. When the tone sensor 56 initially senses the tone, it switches switch 58 to connect the amplifier 24 to the telephone line. When the timer 54 finally times out, it causes switch 58 to disconnect device 18 from the telephone line.

Figure 3A:
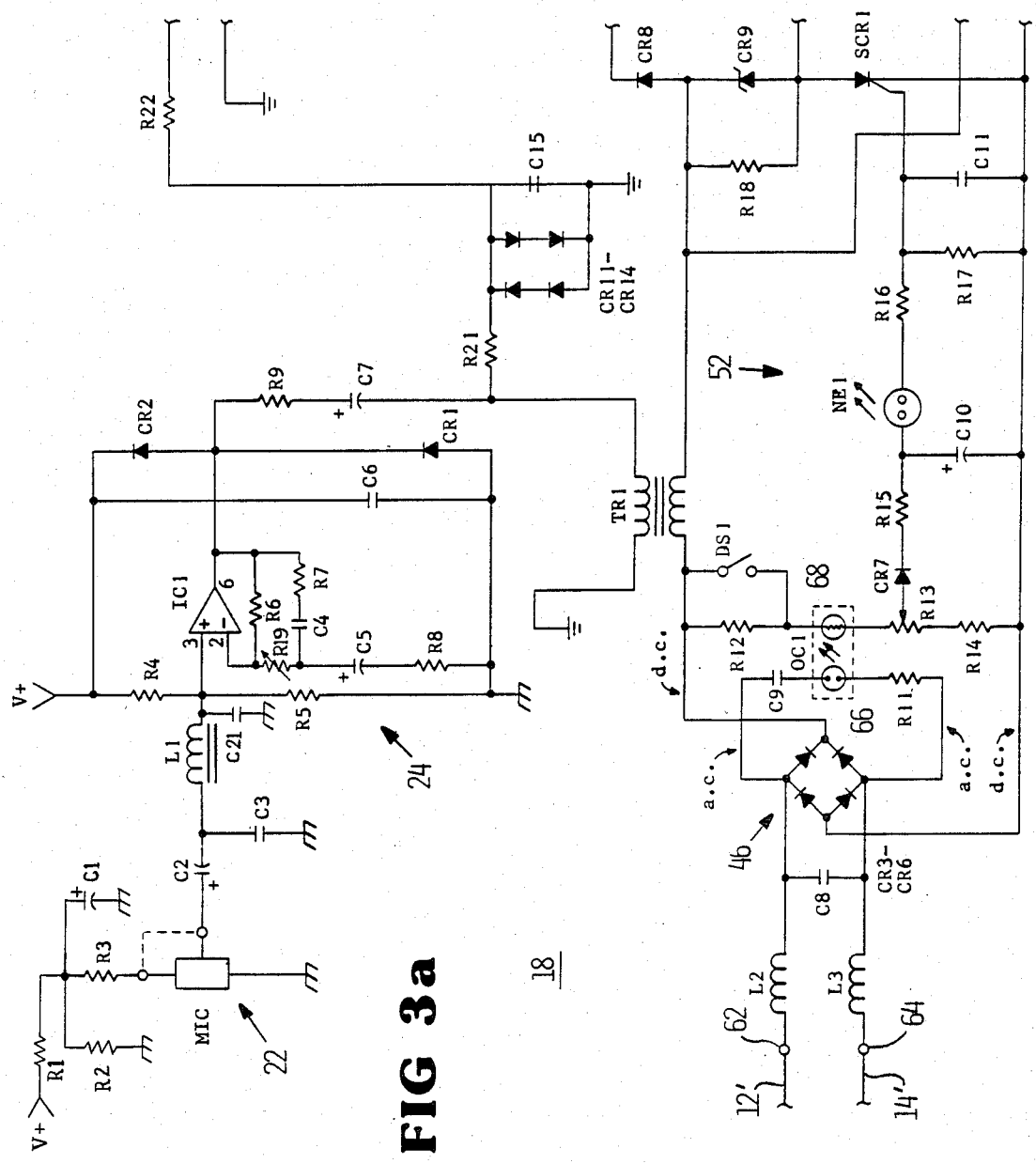
FIGS. 3a and 3b are a schematic of a tested embodiment of the present invention.
Figure 3B:
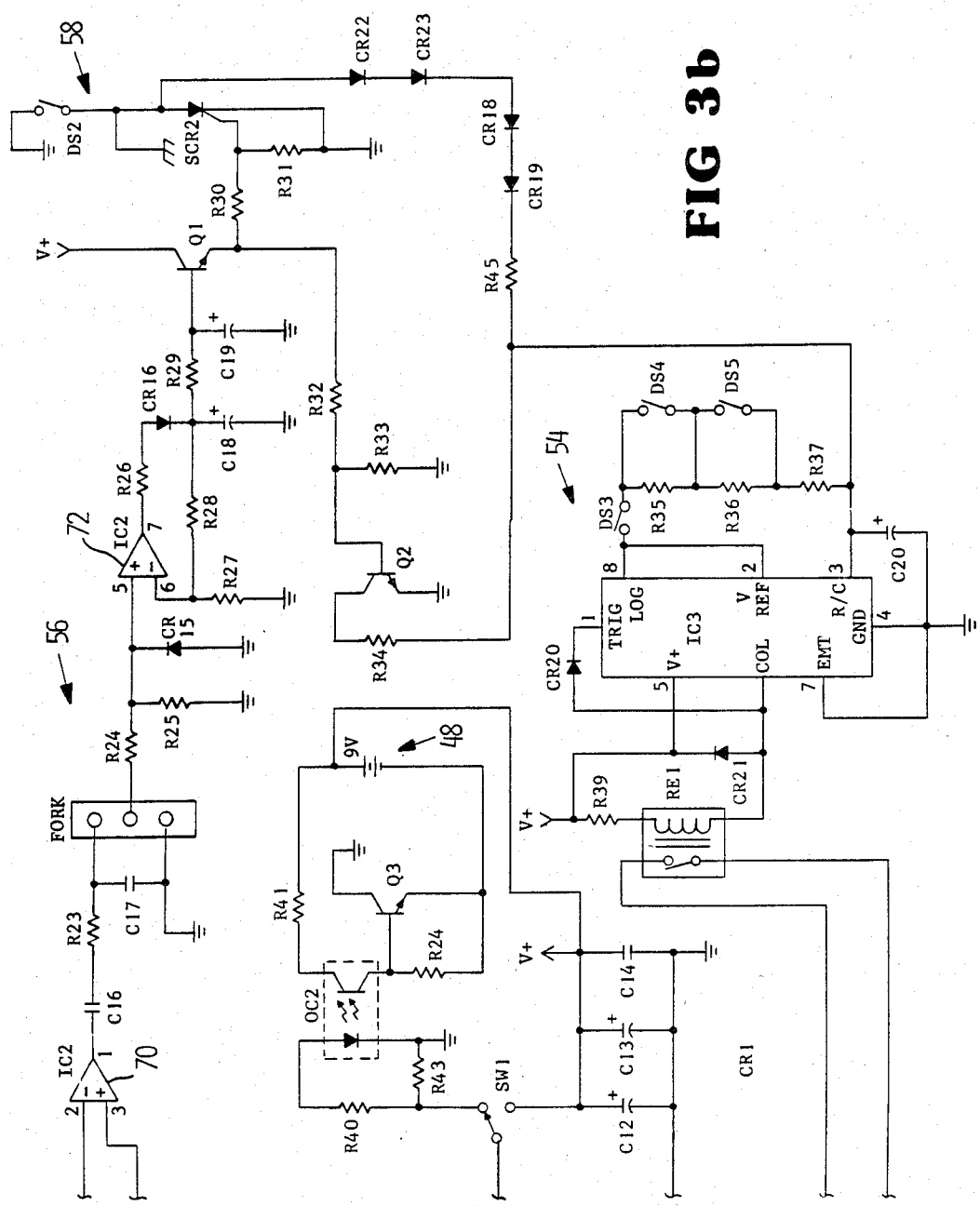

Turning now to FIG. 3, which appears on two sheets as Part (a) and Part (b), the schematic of a commercially tested embodiment of the present invention is shown. The functional designation areas corresponding to the block diagram of FIG. 2 are indicated with like numbers in FIG. 3. The rectifier portion is generally indicated as 46. The tip and ring 12', 14', are connected to terminals 62 and 64 respectively. The two inductors L2 and L3 in combination with capacitor C8 comprise an RF filter. The actual rectifying is done by the bridge rectifier comprising the diodes CR3–CR6.

Figure 4:
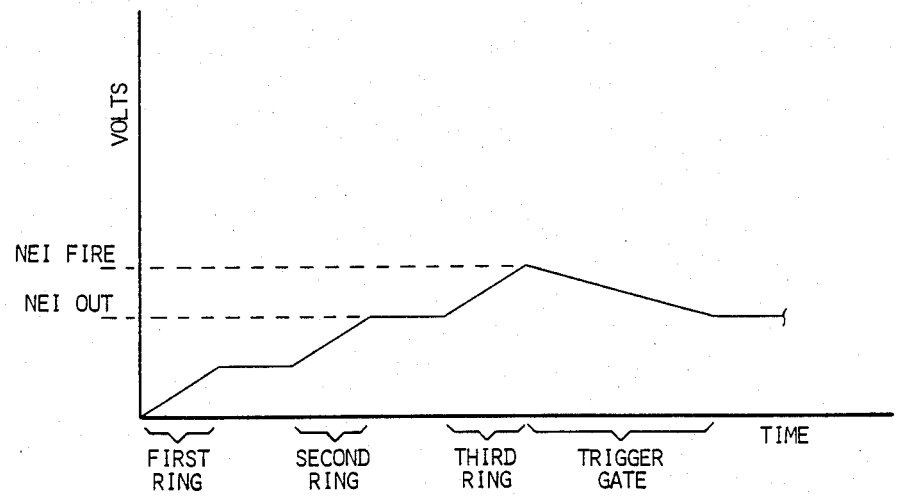
FIG. 4 is a voltage versus time diagram showing the waveform associated with counting the rings on the line before the device is activated.

As can be seen, the A.C. signal from the tip and ring 12', 14' is coupled through capacitor C9 and resistor R11 to the neon lamp 66 contained within the optical coupler defined by the dashed box OC1. Every time a high voltage ring signal appears across the tip and ring 12', 14', the neon lamp 66 is illuminated. The resistors R12 and R14 along with the resistive portion 68 of the optical coupler OC1 and the potentiometer R13 form a voltage divider network. As will be noted, the switch labelled DS1 is placed in parallel with resistor R12. Switch DS1 forms a course adjustment for a ring delay. Potentiometer R13 forms a fine tuning for the ring delay. When a ring signal appears on the tip and ring 12', 14', the neon lamp 66 illuminates, causing resistive portion 68 of optical coupler OC1 to become conductive. Depending on the position of switch DS1 and the wiper of resistor potentiometer R13, a voltage signal passes through diode CR7 and resistor R15 to partially charge the electrolytic storage capacitor C10. This charging action acts as a counter for the rings, as shown in FIG. 4. Upon every ring, the capacitor C10 charges to a higher voltage. When the voltage stored in capacitor C10 reaches the firing voltage of the neon lamp NE1, it fires and a pulse passes through resistor R16 to the control electrode of the silicon control rectifier SCR1. Resistor R17 and capacitor C11 assure that a false triggering of rectifier SCR1 will not occur. The combination of neon lamp NE1, resistor R16, and capacitor C10 discharging assures that the pulse duration is maintained for a sufficient time to fire the silicon control rectifier SCR1. With switch SW1 in the position as shown, the main power for the device 18 is derived from the telephone line. With switch SW1 in the opposite position, the firing of neon lamp NE1 causes optical coupler OC2 to conduct which, in turn, causes transistor Q3 to conduct such that the V+ voltage is supplied by the battery 48. As can be seen, with the silicon control rectifier SCR1 conducting, the D.C. voltage appears at output terminal V+, which is connected to the remaining inputs on the circuit labeled "V+". The capacitors C12, C13 and C14 act as filters and the zener diode CR9 prevents the voltage from exceeding the maximum allowable.

As will be recalled, once the number of rings have been reached which causes the device 18 to be activated, it next looks for a specific tone unless switch DS2 is closed which will automatically turn on the microphone 22. Tone search occurs in the area generally indicated as 56. Once the voltage V+ appears, any tone signal appearing on the primary of transformer TR1 is coupled through to the secondary thereof. The tone then passes through resistor R21 and resistor R22 to the amplifier 70 contained in an integrated circuit generally labeled "IC2". In this regard, resistor R22 provides impedance matching and the diodes CR11–CR14 in combination with the capacitor C15 provide peak clipping and high frequency filtering, respectively. The output of amplifier 70 is connected to the piezoelectric resonator labelled "FORK" (since it acts like a tuning fork). Capacitor C16, resistor R23, and capacitor C17 provide coupling and high frequency filtering to the resonator. The resonator employed in the tested embodiment being described herein is made by the Murata Company and is designated as Part No. EFM-GA. Accordingly, it is responsive to a single tone in a frequency range between 1500 Hz to 2000 Hz, for example. A corresponding sending unit for applying the tone to the telephone line through the mouthpiece of a telephone is available from various suppliers.

When the resonator (Fork) is stimulated by its responsive frequency after its input from the amplifier 70, it outputs a signal through the voltage divider and impedance matching resistors R24 and R25 as an input to amplifier 72 of IC2. The diode CR15 clips the negative portion of the signal into the amplifier 72 such that amplifier 72 acts as an AC/DC converter. Resistors R27 and R28 set the gain of amplifier 72. The output of amplifier 72 is rectified by diode CR16 and stored by capacitor C18. Resistor R29 and capacitor C19 provide a delay so that a remote signal must be present for a minimum period of time before transistor Q1 conducts. When transistor Q1 conducts, silicon control rectifier SCR2 fires. Resistor R30 limits the current to the gate of rectifier SCR2. Resistor R31 holds the gate at a low impedance to prevent false triggering. When rectifier SCR2 conducts, the amplifier circuit is operational, since the amplifier 24 is connected only to chassis ground, as will be noted, and when rectifier SCR2 conducts, it connects the chassis ground to system ground. Switch DS2 is provided to short out rectifier SCR2. When so shorted, the remote security feature is eliminated, since the amplifier 24 is always connected to ground and, therefore, operational as soon as voltate appears at V+.

Each time transistor Q1 conducts as the result of a remote signal, transistor Q2 also conducts. When transistor Q2 conducts, it shorts out the timing capacitor C20 of integrated circuit IC3 through resistor R34. This causes the timer 54 to reset as described and the timing cycle required between receipt of the tone signals (typically 5 minutes) to start over again. The timer, integrated circuit IC3, and its associated components, form a simple RC timer that drives relay RE1. The contacts on RE1 short the silicon control rectifier SCR1 and cause the unit to disconnect from the telephone line. The time period is set by resistors R35, R36 and R37. By closing switches DS3, DS4 or DS5, several time periods may be selected. For calling party control (CPC) only, switch DS3 can be opened. A small leakage current through CR22, CR23, CR18, CR19 will also charge C20 to give a master timer duration of approximately 20 hours if DS3 is not closed.

The amplifier 24 consists of integrated circuit IC1 and its associated components. Resistors R1, R2, and capacitor C1 are a voltage divider and filter circuit for power to the microphone. Audio from the microphone 22 is fed through capacitor C2. Capacitor C21 and inductor L1 are an RF filter. Audio is fed into the positive input of IC1, making a noninverting linear amplifier. Resistor R4 and R5 form a D.C. bias to allow single-ended power supply operation. Variable resistor R19 provides a means of adjusting the output level of the amplifier. Two RC filters are used to form a bandpass filter. Resistor R6 and capacitor C4 form a lowpass filter, or resistor R8 and capacitor C5 form a highpass filter. These filters shape the audio response for maximum intelligibility. The capacitor C6 is placed physically close to IC1 as a power supply filter capacitor. Diodes CR1 and CR2 are output protection diodes. Resistors R9 and R10 along with capacitor C7 form the equivalent output impedance and D.C. blocking.

Wherefore, having thus described our invention, we claim:

1. A security listening system activated by and transmitting over telephone lines, comprising:
   connecting means for electrically connecting to the telephone line;
   first sensing means operably connected to said connecting means for sensing ring signals on the telephone line;
   timer means operably connected to said first sensing means for providing a controlled time period after said sensing means senses a pre-established number of rings in a ring sequence;
   second sensing means operably connected to said timer means and said connecting means for sensing the presence on the telephone line of a pre-established tone during said controlled time;
   a microphone for detecting sound;
   an amplifier operably connected to said microphone for producing sound detected by said microphone amplified at an output thereof;
   switch means operably connected to said connecting means, said second sensing means, and said output of said amplifier for connecting said output of said amplifier to the telephone line when said pre-established tone is sensed during the duration of said controlled time period; and
   restart means operably connected to said second sensing means, said switch means, and said timer means for restarting said timer upon the receipt of subsequent ones of said pre-established tone when said amplifier is connected to the telephone line whereby said controlled time period can be extended.

2. The security listening system, as claimed in claim 1, and comprising:

rectifier means having a power input connected to said connecting means and a D.C. output connected to the remaining ones of said enumerated means for providing D.C. power to said latter named means for operation derived from the power source on the telephone line.

3. A security listening system activated by and transmitting over telephone lines, comprising:

connecting means for electrically connecting to the telephone line;

counting means operably connected to said connecting means for outputting a signal when a ring sequence on the telephone line reaches a pre-established number of rings;

timer means operably connected to receive said signal from said counting means for establishing a time delay period following receipt of said signal;

frequency responsive sensor means operably connected to said connecting means for detecting the presence on the telephone line of a control signal of a pre-established frequency for a pre-established minimum duration;

switch means having an output operably connected to said connecting means and an input, and being further connected to said timer means and said sensor means for connecting said input to said output when said sensor means detects said control signal during said time delay period;

a microphone for detecting sound;

a sound amplifier having an input operably connected to said microphone and an output producing an amplified electrical signal operably connected to said input of said switch means; and restart means operably connected to said frequency responsive sensor means and said timer means for resetting said timer means upon receipt of subsequent ones of said control signal when said switch means has said input connected to said output whereby said time delay period can be extended.

4. A security listening system activated by and transmitting over telephone lines, comprising:

sensing means operably connected to said telephone lines for sensing ring signals on said telephone lines;

counter means operably connected to said sensing means for outputting a signal after a predetermined number of ring signals;

timer means operably connected to said counter means for disconnecting said telephone lines in the absence of a tone signal after a given time from said predetermined number of ring signals;

second sensing means operably connected to said counter means for sensing the presence of a tone signal after said predetermined number of ring signals and for then outputting said signals;

microphone means for detecting sound;

switch means operably connected to said telephone lines, said counter means, and said microphone means for connecting said microphone means to said telephone lines upon receipt of said tone signal after said predetermined number of ring signals is sensed; and restart means operably connected to said second sensing means, said switch means, and said timer means for restarting said timer means on receipt of a subsequent tone signal.

* * * * *